United States Patent [19]

Barron

[11] 3,812,723

[45] May 28, 1974

[54] FORCE MEASURING WEIGHING DEVICE

[75] Inventor: Charles D. Barron, Fountain Valley, Calif.

[73] Assignee: Byron Jackson, Inc., Long Beach, Calif.

[22] Filed: Jan. 21, 1972

[21] Appl. No.: 219,741

[52] U.S. Cl.................. 73/434, 177/208, 177/209
[51] Int. Cl............................................. G01g 5/04
[58] Field of Search...... 73/434, 435, 433; 177/208; 188/297; 92/35

[56] References Cited
UNITED STATES PATENTS

| 2,553,810 | 5/1951 | Carlson | 188/297 |
| 3,425,503 | 2/1969 | Bullivant et al | 177/208 |
| 3,541,863 | 11/1970 | Barron et al | 73/434 |

Primary Examiner—James J. Gill
Assistant Examiner—Anthony V. Ciarlante
Attorney, Agent, or Firm—William S. McCurry

[57] ABSTRACT

A weighing device such as a U-tube densimeter for measuring the densities of liquids and producing indications of densities including a fluid pressure operated load or force measuring unit employing a booster pilot. The measuring unit has provision for balancing the tare weight of the U-tube and for making a zero set calibration for the U-tube.

40 Claims, 3 Drawing Figures

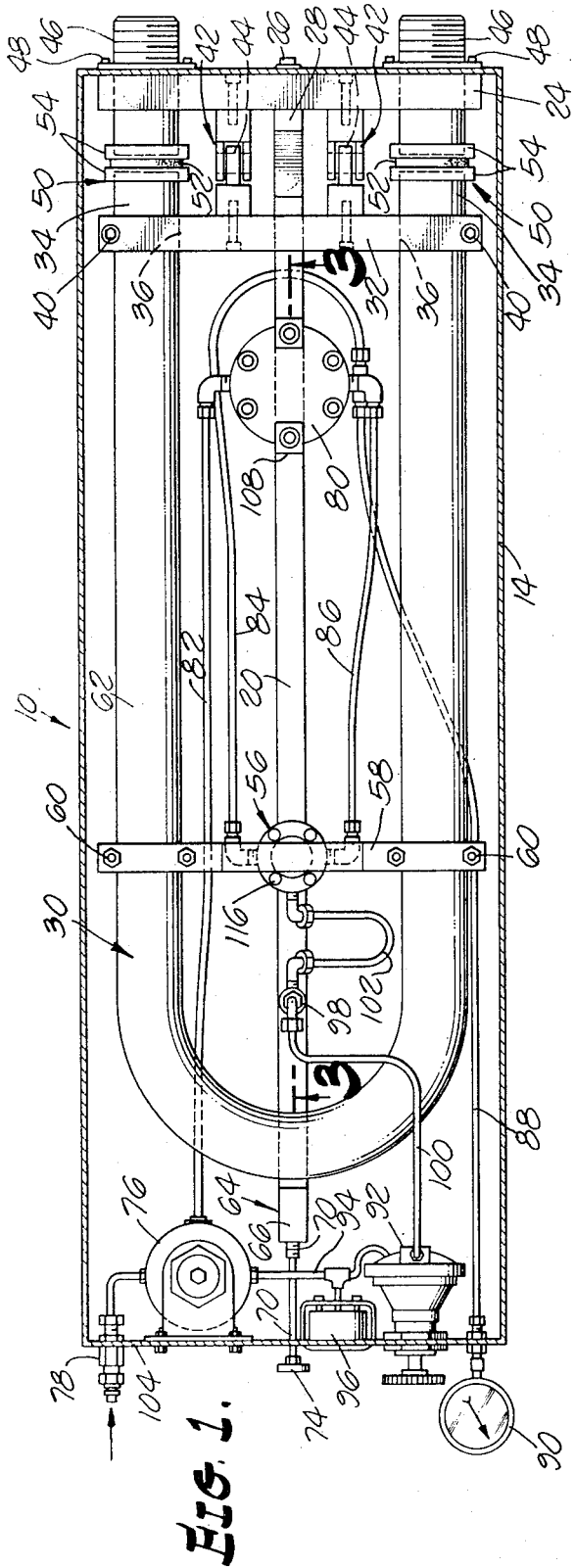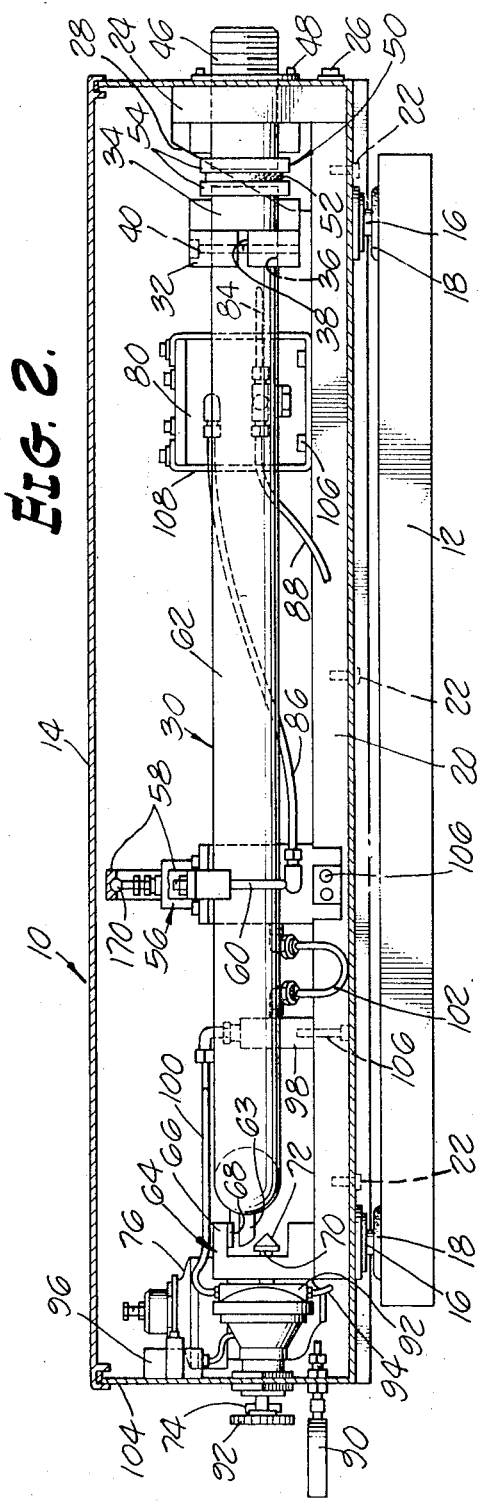

FORCE MEASURING WEIGHING DEVICE

BACKGROUND OF THE INVENTION

This invention relates to weighing systems such as fluid densimeters. More specifically, the invention pertains to a densimeter incorporating an improved fluid pressure operated load or force measuring unit which may include an integral hydraulic dampener.

U-tube densimeters have been developed which employ counterweights for balancing tare weight and separating dashpots or dampening devices to attenuate U-tube oscillation such as shown in U.S. Pat. Nos. 3,187,584 and 3,039,310. More recent U.S. Pat. No. 3,541,863 shows a U-tube densimeter having a separate fluid pressure operated actuator device connected with the U-tube which serves both to dampen U-tube oscillation and to balance the tare weight of the U-tube assembly.

SUMMARY OF THE INVENTION

The present invention provides a weighing device such as a U-tube densimeter wherein the requirement has been substantially eliminated that the mounting of the essential components of the device relative to one another be essentially rigid and stable with respect to the U-tube frame to ensure repeatable measurements.

The present invention also provides a force measuring unit having the combined features of coarse mechanical zero adjustment, fine fluid pressure responsive zero adjustment and oscillation attenuation, all as a readily adjustable and easily replaceable integral unit.

The present invention also provides a weighing device such as a U-tube densimeter which may be subjected to movement and shocks when not in use without affecting the efficiency and accuracy of the force measuring unit.

The invention further provides a weighing device such as a U-tube densimeter wherein the output measurement indication will be more rapid with wide variation of the density to be measured and slower on a smaller variation of such density thereby tending to stabilize the output indication.

The foregoing and other provisions and advantages are attained in the weighing device shown and described herein including a weighing means mounted to mounting means with substantially free vertical movement therebetween and a force measuring means mounted to measure the gravitational force exerted between said weighing means and said mounting means by a specimen supported by said weighing means. The measuring means comprises a movable support member connected through a resiliently biased and adjustable support means into weight supporting relation with the weighing means and through a first fluid pressure responsive expandable force opposing means to a body carried by said mounting means to oppose the gravitational force exerted by the specimen in response to a first fluid pressure exerted within the first opposing means. A second fluid responsive expandable force opposing means is mounted between the support member and the body to oppose the gravitational force of the weighing means and a selected portion of the gravitational force of the specimen in response to a second fluid pressure exerted within the second opposing means. Indicating means is connected to communicate with said opposing means to indicate the weight of the specimen as a function of the first fluid pressure. A restriction means is connected with the second opposing means to dampen changes in the second fluid pressure and pilot means is connected to supply fluid under pressure to the first opposing means in quantity and pressure dependent on the first fluid pressure.

BRIEF DESCRIPTION OF THE DRAWING

FIG. 1 is a plan view of the preferred embodiment of a weighing device such as a densimeter in accordance with the invention, the outer housing being shown in section;

FIG. 2 is an elevational view of the densimeter of FIG. 1, the outer housing being shown in section.

DESCRIPTION OF THE PREFERRED EMBODIMENT

Figure 3:
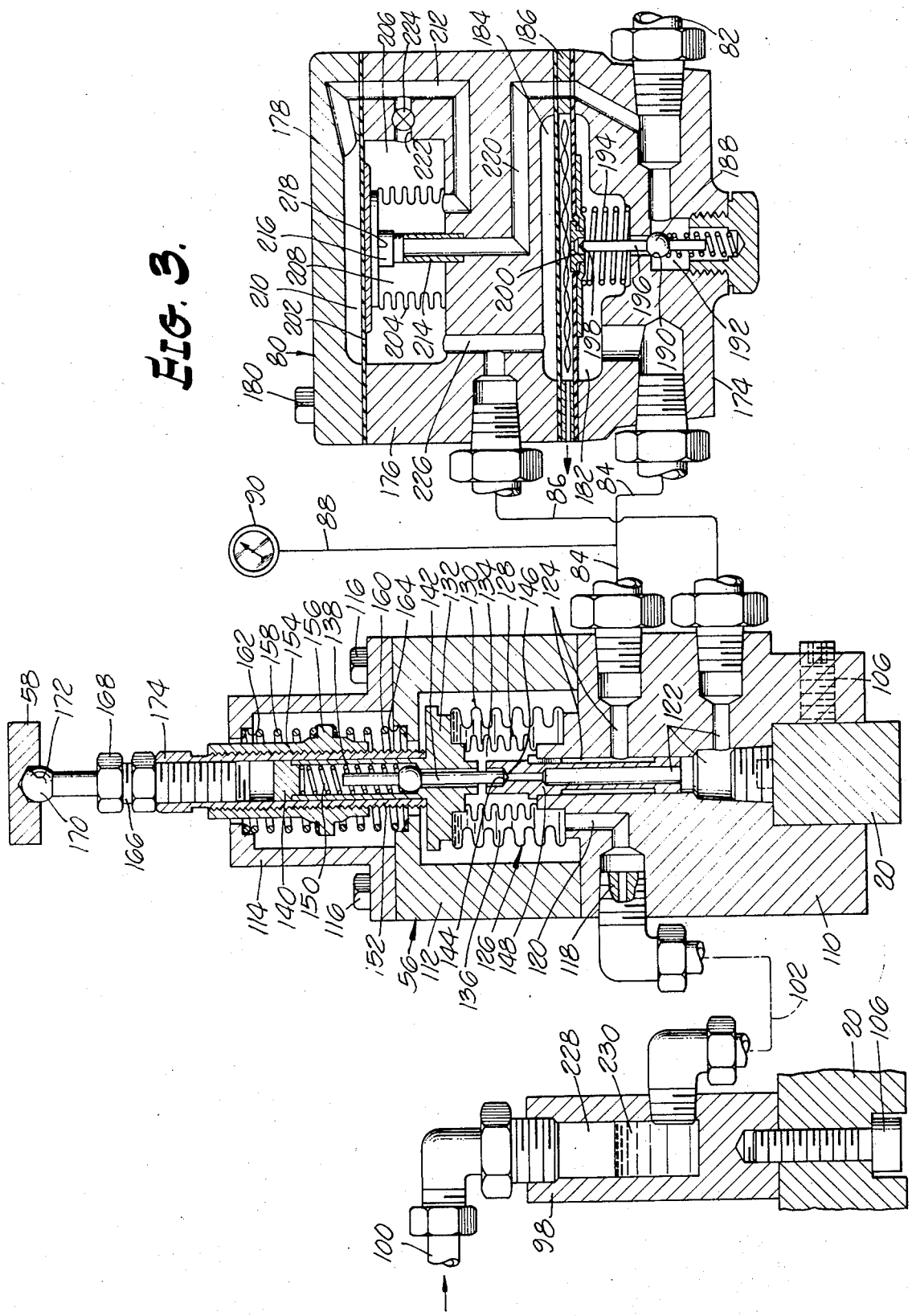
FIG. 3 is a semi-schematic sectional view of the measurement, force balance and dampening components utilized in the device shown in FIGS. 1 and 2.

Referring to the drawings, particularly to FIGS. 1 and 2, the densimeter 10 shown therein has a mounting base 12. Posts 16 mounted in resilient grommets 18 support the housing or case 14 in which the densimeter is housed. A center rail 20 that forms a base for the densimeter extends longitudinally within the case 14 and is secured to the case by fastener screws 22. A transverse, vertical plate 24 is secured to the center rail 20 by a cap screw fastener 26 extends through the case 14, through the plate 24, and threaded into the center rail 20. A gusset plate 28 is fitted into the angle between the center rail and the plate 24 and is fastened to these members to strengthen the assembly.

The densimeter has a weighing receptacle shown as U-tube assembly or unit 30 pivotally supported on the plate 24 for swinging movement about a horizontal axis. The pivotal mounting means of the U-tube is best seen in FIGS. 1 and 2. Referring to these figures, it is seen that a U-tube mounting bracket 32 supports a U-tube 62 adjacent to its open ends 34. The ends of the U-tube pass through holes 36 in the mounting bracket. The bracket has slots 38 in its outer ends that open into the holes 36 so that the screws 40 when tightened will contract the bracket about the ends of the U-tube 62 to hold it securely in the bracket.

A pair of hinges, each designated by the reference numeral 42, is fastened between the U-tube mounting bracket 32 and the plate 24 by means of fastener screws. The hinges have pivots 44 that are aligned with each other along a pivot axis that intersects the extended axes of the open ends of the U-tube at right angles.

A liguid, the density of which is to be sensed or measured, is circulated through the U-tube. For this purpose flanged nipples 46 having the same external and internal diameters as the U-tube, are mounted in the plate 24 in alignment with the legs of the U-tube. These nipples pass through suitable appertures in the plate 24 and the housing 14 and are secured in place by fastener screws 48 extending through the flanges of the nipples and threaded into the plate 24.

The nipples 46 are connected to the ends of the U-tube by couplings 50. As best seen in FIG. 1, each coupling 50 has a flexible sleeve 52, such as a neoprene sleeve, fitted about the ends of the nipple and the U-tube leg. Metal rings 54 are bonded to sleeve 52 and surround the sleeve 52 at each end to prevent radial expansion of the sleeve. It will be seen from FIG. 1 that the axis of the pivots 44 extend transversely through the centers of the couplings 50, and that this axis is located midway between the ends of the nipples 46 and the open ends 34 of the U-tube 30. The flanged nipples 46 are suitably threaded on their outer ends for connection to liquid inlet and outlet lines as shown.

It will thus be seen that the U-tube 30 is mounted for pivotal movement about the horizontal axis of the pivots 44. As seen in FIG. 2, the U-tube 30 is urged by gravity to pivot in a counterclockwise direction. A device denominated herein as a force or load measuring unit or cell, designated by the general reference numeral 56, opposes this tendency. This force unit 56 will be described in detail hereinafter. The U-tube 30 is seen to be comprised of a U-tube element 62 supported in force imposing contact with force unit 56 through a support yoke 58 attached to the tube element 62 by means of yoke U-bolts 60 as shown.

The U-tube element 62 has a tang 63 that projects between the horizontal arms of a C-shaped bracket 64 mounted on the center rail 20. Fixed to the underside of the top arm 66 of the bracket 64 is a resilient pad 68 of rubber or the like, adapted to be engaged by the top of the tang 63 to limit upward movement of the tang and the U-tube. A stem 70 is threaded through the bracket 64, the inner end of the stem carrying a conical head 72. A knob 74, external to the housing or case 14 is fixed to the stem 70 and is employed to turn the stem to advance the head 72 into engagement with the bottom of the tang 63 to force the latter into engagement with the pad 68, thus to lock the U-tube against swinging movements. When the head 72 is in retracted position, as seen in FIG. 2, the U-tube is free to pivot to a limited extent sufficient for proper operation of densimeter 10.

As shown in FIGS. 1 and 2, an air supply pressure regulator 76 is adapted for connection to a source of dry air under pressure (not shown) through a conduit 78. Regulator 76 supplies air at regulated pressure to a booster pilot or unit 80 through a conduit 82. Pilot unit 80 is connected in fluid pressure transfer relationship to force measuring unit 56 through an output pressure conduit 84 and a pilot pressure conduit 86. Output conduit 84 is joined in connection with an indication conduit 88 which terminated into a receiver 90 which may be an indicator, recorder, controller or the like as later mentioned.

Supply regulator 76 also supplies regulated air to a manually adjustable zero set pressure regulator 92 through a conduit 94. Conduit 94 is also joined in connection into a pressure indicator 96 with which the pressure of the regulated air from regulator 76 may be adjusted and monitered. Conduit 94 may be directly joined with the supply conduit 78 to the prime air supply rather than being connected into regulator 76 as shown, depending on the regulated output levels of pressure which may be required.

Regulator 92 supplies air at selected pressure into a liquid reservoir 98 through a set pressure conduit 100. Reservoir 98 supplies a liquid of suitable viscosity, such as a silicone fluid or oil, into force measuring unit 56 through a liquid conduit 102 for purposes later described.

As shown, regulators 76 and 92, indicators 90 and 96 and stem knob 74 are commonly mounted to an end 104 of housing 14 for ready connection and operation of the densimeter 10. Also as seen in FIGS. 2 and 3, the force unit 56, pilot booster 80 and reservoir 98 are appropriately mounted to center rail 20 with fasteners 106, booster pilot 80 being supported above the rail by a U-bracket 108.

The construction details and interconnection of force unit 56, booster pilot 80 and reservoir 98 are shown in FIG. 3.

Force unit 56 is seen to include a mounting body 110, a bellows housing 112 and a spring housing 114, all formed generally cylindrical and axially connected as shown by means of fasteners 116, such as cap screws. Body 110 is mounted to support rail 20 by means of a set screw fastener 106.

Liquid conduit 102 from reservoir 98 is connected through a fluid flow restriction means such as an orifice fitting 118 into communication with a passage 120 defined in mounting body 110. Pilot supply conduit 84 from booster pilot 80 is connected into communication with a supply passage 122 defined in body 110. Pilot booster conduit 86 from pilot 80 is connected into communication with an output passage 124. Indication or delivery conduit 88 is connected into communication between conduit 84 and receiving means 90 such as an indicator, controller, relay, or the like.

Mounted to body 110 is a bellows unit 126 including a cylindrical flexible bellows 128 concentrically nested within a cylindrical bellows 130, both bellows being attached to body 110 and to a closure plate 132 as shown, by means of epoxy cement, silver solder or the like, to define an output pressure chamber 134 and a zero set pressure chamber 136. Bellows unit 126 also includes a support tube 138 axially projecting from closure plate 132 and sealed at the distal end by a plug 140. Housed within tube 138 and extending through a hole axially defined through closure plate 132 is a valve member 142. The extending stem of valve member 142 terminates in a valve 144 engageable with a valve seat 146 radially defined on the ends of a hollow flanged valve spool 148 received within supply passage 122. Valve member 142 is movably biased into normally extended position as shown by means of a valve overtravel protection spring 150 received within tube 138 and maintained in compression by plug 140.

A hollow cylindrical adjustment sleeve 152 having external screw threads is rotatably mounted about tube 138 in abutment with closure plate 132 and extends through bores defined as shown through housings 112 and 114. A zero set coarse adjustment collar 154 having internal threads and an external radial flange 156 is adjustably engaged about sleeve 152. Springs 158 and 160 are confined within housing 114 on each side of flange 156 between a counterbore 162 axially defined within housing 114 and a counterbore 164 axially defined on housing 112. As assembled, springs 158 and 160 are biased in compression to cause a resulting axial force on flanges 156 and collar 154 of intensity determined by the size and spring rate of the respective springs. Springs 158 and 160 are attached to flange 156 and to the faces of counterbores 162 and 164, as by epoxy cement or the like, in a manner preventing rotation of collar 154 within housing 114. Rotation of adjustment sleeve 152 within collar 154 consequently is made in U.S. Pat. No. 2,516,333, specifically incorporated herein by reference.

Reservoir 98 is seen to be an elongated hollow upright member attached to center rail 20 by means of fastener 106. Reservoir 98 defines a chamber 228 which chamber is in communication at its upper end through conduit 100 to the outlet of set pressure regulator 92. Chamber 228 is also in communication at its lower end through conduit 102 and restriction orifice 118 and passage 120 into zero set chamber 136. Chamber 228 is partially filled with a pressuring and dampening liquid 230 of selected viscosity which liquid also completely fills chamber 136, passage 120, restriction 118 and conduit 102. As examples, liquid 230 may be a silicone fluid and the orifice bore in restriction 118 may be in the order of 0.028" (0.71 millimeter).

Air at a preselected and adjustable pressure from regulator 92 is imposed on liquid 230 within chamber 228, causing the liquid to exert the same pressure within the chamber 136 and to an annular face of closure plate 132 which is defined by the ends of bellows 128 and 130, causing a corresponding extensive force to be exerted through closure plate 132, sleeve 152 and support rod 166 to oppose the weight of U-tube unit 30 transmitted through yoke 58. Thus, appropriate adjustment of the liquid pressure in chamber 136 will balance the weight of the assembly of U-tube unit 30. Ordinarily, the U-tube is so balanced when filled with liquid.

In operation, air from the fluid supply connection 82 passes through the supply connection 220 to and through the automatic restriction unit housed in sections 176 and 178, through the delivery connection 226 to the chamber 184 on the upper side of the diaphragm 186, and to the valve 144 in the force measuring unit 58. The fluid from the valve 144 flows into the chamber 134 and passes through the fluid passage 124 and conduit 86 to the fluid delivery conduit 88 and then to the receiver 90.

Fluid from the fluid supply connection 82 also flows into the valve chamber 192 from which it is admitted as required by the valve 188 to the chamber 182 against the underside of the diaphgram 186, and passes through the fluid connection 84 to receiver 90 at the same pressure as found in chamber 134.

At any condition of equilibrium, the force imposed on closure plate 132 from the weight of U-tube unit 30, the pressure in the chamber 134 opposing such force, and the spring effect of the bellows 128 and 130 will be balanced, and the control valve 144 will be very nearly but not quite in contact with the valve seat 146. The pressure in the chamber 184 will be sufficiently higher than that prevailing in the chamber 182 to compress the spring 194 to the extent that valve 188 is seated and valve 198 exhausts the pressure fluid supplied through the connection 226 and conduit 84 from chamber 206.

Any increase in the weight of U-tube unit 30 will momentarily elevate the control member 216 carried by the diaphragm 202 away from the nozzle valve 214, and the flow of fluid through the delivery connection 226 will cause a building up of pressure in the chamber 184. This causes the diaphragm 186 to move the seat 200 to closed position with respect to the valve 198 and open the valve 188, allowing supply fluid from the fluid supply connection 82 to flow from the chamber 192, past the valve 188, through the chamber 182 and into the chamber 134 by way of the fluid connections 86 and 124 until the pressure in the chamber 134 is again in balance with the weight imposed by the U-tube unit 30 through closure plate 132.

A decrease in the weight of U-tube unit 30 will move the closure plate 132 and the valve 144 carried thereby away from the valve seat 146, permitting the pressure in the chamber 184 to decrease, thus closing the valve 188 and opening the valve 198. Pressure fluid will then escape from the chamber 134 by way of the fluid connections 124 and 86, the valve 198 and through the diaphragm 186 to the atmosphere.

Any change in weight of U-tube unit 30 will cause movement of valve 144 and control member 216 at a deliberate and selected speed corresponding to the flow of liquid through restriction orifice 118 into and out of chamber 136. Thus the liquid in chamber 136 accomplishes a dual purpose of providing zero balance for U-tube unit 30 and of dampening or attenuating rapid changes or cycling of the fluid pressure in output chamber 134.

OPERATION

The operation of the densimeter specifically shown and described herein will be largely apparent from the foregoing description. However, the following brief description of setting up and operating the densimeter will now be given.

The densimeter is preferably placed in a substantially level position. The air supply line 78 is connected to a suitable source of air under pressure (not shown). By way of example, air may be supplied to the densimeter at a pressure of from about 25–30 p.s.i. (1,750–2,100 gram/sq. centimeter) to about 300 p.s.i. (42,800 grams/sq. centimeter). The first pressure regulator 76 is adjusted to supply compressed air to the conduits 82 and 94 at a substantially constant pressure of about 25 p.s.i. (1,750 grams/sq. centimeter), as indicated by the first air pressure gauge 96. The second pressure regulator 92 is then adjusted to supply air at a substantially constant pressure of about 7.5 p.s.i. (525 grams/sq. centimeter) to the reservoir 98 through the conduit 100. The tang 63 of the U-tube 62 is unlocked by manipulation of knob 74 in a direction to withdraw the conical head 72 from beneath the tang. The U-tube unit 30 is now free to pivot on its horizontal axis through the pivot hinges 44.

The chamber 136 of the force measuring unit 56 will have been completely filled with a liquid 230 as previously mentioned, and this liquid fills not only the chamber 136 but also the liquid passages 120, 118 and 102, and also fills approximately the bottom half of the liquid chamber 228, as seen in FIG. 3.

The second pressure regulator 92 is carefully adjusted so that the U-tube 30 assumes a substantially horizontal position with the tang 63 positioned about midway in the space between the pad 68 and the conical head 72. This zero adjustment is made with the U-tube filled with liquid. Next, the densimeter is calibrated by adjustment of the load unit 56 first with water being circulated through the U-tube, and again with a liquid of greater and known density being circulated through the U-tube. With these two standard liquids, a zero adjustment of the receiver 90 and a span or sensitivity adjustment are made.

It will be seen that when the set screw 106 and the U-bolts 60 are loosened, the force unit and its yoke 58 varies the resulting force intensity produced by springs 158 and 160, as later mentioned.

Adjustably threaded into the distal end of sleeve 152 is a support rod 166 having a wrench head 168 and a pivot head 170 which head is provided as a ball adapted to be pivotally received in a pivot bore 172 defined in yoke 58. Engagement of pivot ball 170 within bore 172 is maintained only by the weight of the U-tube assembly, such weight being removed when the U-tube 62 is secured against pad 68 by head 72 within C-bracket 64. When the U-tube is thus secured, the force unit 56 is free of weight and thereby protected against damage from movement by the U-tube unit 30 when densimeter 10 is moved or vibrated.

A wrench head 174 is provided at the distal end of sleeve 152 as means of rotating the sleeve for adjustment of collar 154 between springs 158 and 160. A hex headed lock nut is threaded onto support rod 166 into abutment with sleve 152 to lock the support rod and pivot head 170 at a distance selected to roughly balance the weight of U-tube unit 30 and liquid contents slightly below the weighing range.

As provided, valve spool 148 has appropriate lands at either end to define an annular passage forming a continuation of output passage 124 which extends through a slot defined in the land disposed adjacent valve seat 146 into communication with output pressure chamber 134. The interior of valve spool 148 forms a continuation of supply passage 122 into communication with valve 144 at valve seat 146.

The weight variation of U-tube 30, caused by changes in density of liquid flowing through the tube, creates a corresponding force against closure plate 132.

The initial weight of the U-tube unit 30 including yoke 58 and liquid contents is coarsely opposed and balanced by adjustment of the resulting force of springs 158 and 160 through rotation of sleeve 152 within collar 154. A fine adjustment for zero balance of the U-tube assembly 30 when weighted with a particular liquid flowing through the U-tube is achieved by provision of adjustment of fluid pressure within zero set chamber 136, as later mentioned.

Booster pilot 80 has body sections 174, 176 and 178 secured in assembly by fasteners 180 as shown. Section 174 defines a chamber 182 in communication with booster conduit 86. A chamber 184 is defined by section 176 and a ventilated diaphragm 186 confined between sections 174 and 176. The diaphragm 186 controls a valve member 188, movable with respect to a seat 190 in a chamber 192 defined in section 174, for controlling the delivery of air from chamber 192 to chamber 182. A spring 194 is provided, effective on the lower side of diaphragm 186, for determining the pressure differential across the valve 144 in unit 58.

A stem 196 on which valve 188 is carried is also provided with a valve 198 for engagement with a valve seat 200 carried by the diaphragm 186 for controlling the air bled through the diaphragm to atmosphere from chamber 182. The chamber 192 is supplied with air through supply conduit 82.

A flexible diaphragm 202 is provided in sealed relation between body sections 176 and 178. Connected in sealed relation between diaphragm 202 and the bottom of a cylindrical cavity defined within section 176 is a flexible bellows 204. Such structure defines an annular chamber 206 between the outside of bellows 204 and the cavity within section 178; a cylindrical chamber 208 within bellows 204 and closed by the bottom of the section cavity and by diaphragm 202, and a chamber 210 defined by diaphragm 202 and a cavity defined with body section 178.

As shown, the bellows 204 and the diaphragm 202 are in the normal operating condition. If the composite structure were in a free condition, the bellows 204 would be considerably longer than illustrated. Body sections 176 and 178 define an equalizing passageway 212 for free passage of air between chamber 208 and chamber 210.

A nozzle valve member 214 is axially mounted within chamber 208 with a valve 216 in connected relation with a control member 218 also forming a closure for bellows 204 and a movable support under diaphragm 202

The nozzle 214 has an air supply connection 220 defined within body sections 174 and 176 and in communication with booster supply conduit 82.

The chamber 206 is connected through a passage 222 define in body section 176 into communication with chamber 206 and chamber 210. An air flow restriction 224 is mounted within passage 222 to function as later mentioned.

Chambers 184 and 206 are in communication through a passage 226 which passage is joined into communication with conduit 84 to provide the pressure in chambers 184 and 206 to be the same as the pressure in passage 122 at valve 144 of force unit 58. Also seen is that the pressure in chamber 134 of force unit 58 is the same as the pressure at receiver 90 and in chamber 182.

Air under pressure from the fluid supply passage 220 passes through the valve member 216 to the chamber 208, then through the conduit 212, and the restriction 222, into the chamber 206 and thereon to the fluid delivery passages 226 and 84. The pressure of the fluid in the fluid delivery connection 84 is effective, through the fluid connection 222, within the chamber 206. The pressure drop across the restriction 224 produces a pressure differential on the bellows closure plate 202 urging the same downwardly, and tending to close the valve 216 against valve nozzle 214.

An equilibrium condition is reached when this differential in an upward direction is just sufficient to balance the spring action of the bellows 204 at a point at which the valve 216 is nearly, but not quite, closed.

The flow may tend to increase due to an increase in the supply pressure effective in the fluid supply conduit 84 and passages 226 or due to a decrease therein. If the flow tends to increase through valve 216, this results in increasing the differential across the restriction 224, and an increase in the differential effective on the closure plate moves the diaphragm 202 and the control valve member 216 thereof downwardly, further restricting the nozzle valve 216 thereof downwardly, further restricting the nozzle valve 214 and throttling the fluid from the fluid supply passage 226.

Similarly, if the flow tends to decrease due to a decrease of supply pressure or an increase of the delivered pressure, this results in a decreased differential on the diaphragm 202 tending to move the diaphragm upwardly, opening the valve 216 and decreasing the throttling of the fluid from the fluid supply passage 220.

Further detailed description of the construction and operation of control apparatus such as booster pilot 80 may be moved longitudinally along the center rail 20 and U-tube 62 to a desired position and thereafter fixed in such position by tightening such screw and the U-bolts. Shifting the force unit 58 away from the pivot axis of the U-tube decreases sensitivity; shifting of the load cell toward the pivot axis of the U-tube increases sensitivity.

Receiver 90 senses the pressure signal of the force unit 56. This gauge is zeroed in a well known manner by adjusting the vertical position of the rod 166 that provides support between plate 132, sleeve 152 and yoke 58. Such adjustment being made with air being supplied to the force unit through the booster pilot 80.

After the sensitivity and the zero output signal of the force unit have been set, the densimeter is in condition to measure the density of an unkown liquid flowing through the U-tube and also to measure variations in such density.

As is known, the force unit 56 operates as a force balance device that restores and maintains the U-tube unit to its neutral or substantially horizontal position as changes in weight of the liquid flowing through the U-tube produces forces tending to displace it from its neutral position. The pressure of air in chamber 134 of the force unit acts on the closure plate 132 to counterbalance the downward force on support rod 166 due to the weight of the liquid in the U-tube. The pressure of the gas in this chamber is directly proportional to this downward force.

If the density of the liquid flowing through the U-tube unit should increase, the closure plate 134 will be urged to move downwardly. This movement pushes the valve member 144 slightly downwardly against the valve seat 146. Air from the passage 122, which is at higher pressure than the air in the upper chamber 134, flows at a decreased rate into the chamber 134 to decrease the pressure therein and to lower the pressure in chamber 182 which causes valve 188 to open, increasing the pressure in chambers 182 and 134 to restore closure plates 132 and the U-tube to the neutral position. In the neutral position the differential pressures across valve 144 is restored and the valve 188 is closed. The gas pressure in the chamber 134 has now been increased in proportion to the increase in density of the liquid flowing through the U-tube, and this increase is reflected in the pressure reading at receiver 90. If the density of the liquid in the U-tube unit should decrease, the above described action would be reversed.

From the foregoing description it will be seen that various changes can be made in the exemplary or preferred embodiment of the densimeter shown and described herein without departing from the spirit of the invention as herein set forth.

That being claimed is:

1. In a weighing device having a weighing means mounted to mounting means with substantially free vertical movement therebetween and a force measuring means mounted to measure the gravitational force exerted between said weighing means and said mounting means by a specimen supported by said weighing means, said measuring means comprising: a movable support member connected through a biased support means resiliently and adjustable biased by an adjustable spring device into weight supporting relation with said weighing means and through a fluid pressure responsive expandable force opposing means to a body carried by said mounting means to oppose the gravitational force imposed by said specimen in response to a fluid pressure exerted within said opposing means, said fluid pressure having an intensity which is a function of the weight of said speciment.

2. The device of claim 1 wherein said support means includes a threaded collar effective against said support member and having a flange axially biased between spring means, a threaded adjustment means to vary the axial position of said flange between said spring means, and an adjustable support rod connected between said adjustment rod and said weighing means.

3. The device of claim 1 wherein said weighing means comprises a tube for receiving a continuous flow of specimen to be weighed.

4. The device of claim 1 including valve means which varies the flow of fluid into said opposing means as a function of said force.

5. The device of claim 1 wherein said force measuring means is operable to measure the gravitational force from a liquid tube weighing means.

6. The device of claim 4 wherein said valve means includes a spring biased valve member carried by said support member for movement with respect to a valve seat included with said body.

7. In a weighing device having a weighing means mounted to mounting means with substantially free vertical movement therebetween and a force measuring means mounted to measure the gravitational force exerted between said weighing means and said mounting means by a specimen supported by said weighing mans, said measuring means comprising: a movable support member connected through a biased support means resiliently and adjustably biased by an adjustable spring device into weight supporting relation with said weighing means and through a fluid pressure responsive expandable force opposing means to a body carried by said mounting means to oppose the gravitational force exerted by said specimen in response to a fluid pressure exerted within said opposing means, said fluid pressure having an intensity which is a function of the weight of said specimen, and pilot means for supplying fluid under pressure to said first opposing means in quanity and pressure responsive to said fluid pressure.

8. In a weighing device having a weighing means mounted to mounting means with substantially free vertical movement therebetween and a force measuring means mounted to measure the gravitational force exerted between said weighing means and said mounting means by a specimen supported by said weighing means, said measuring means comprising: a movable support member connected through a biased support means resiliently and adjustably biased by an adjustable spring device into weight supporting relation with said weighing means and through a first fluid pressure responsive expandable force opposing means into a body carried by said mounting means to oppose the gravitational force exerted by said specimen in response to a first fluid pressure exerted within said first opposing means, the intensity of said first fluid pressure being a function of the weight of said specimen, a second fluid responsive expandable force opposing means mounted between said support member and said body to oppose the gravitational force of said weighing means and a selected portion of the gravitational force of said specimen in response to a second fluid pressure exerted within said second opposing means, and pilot means for supplying fluid under pressure to said first opposing means in quantity and pressure dependent on said first fluid pressure.

9. The device of claim 8 wherein said first opposing means and said second opposing means includes concentrically disposed cylindrical bellows mounted between said movable support member and said body to define a cylindrical fluid pressure chamber and an annular fluid pressure chamber.

10. The device of claim 9 wherein said adjustable support means includes a threaded collar effective against said support member and having a flange axially biased between spring means, a threaded adjustment means to vary the axial position of said flange between said spring means, and an adjustable support rod connected between said adjustment rod and said weighing means.

11. The device of claim 10 wherein said weighing means comprises a tube for receiving a continuous flow of specimen to be weighed.

12. The device of claim 9 including valve means which varies the flow of fluid into said first opposing means as a function of said force.

13. The device of claim 12 wherein said pilot means varies the fluid supplied to said valve means as a function of said force.

14. The device of claim 12 wherein said pilot means includes a control means responsive to said first fluid pressure to vary fluid flow to said valve means.

15. The device of claim 12 wherein said valve means includes a spring biased valve member carried by said support member for movement with respect to a valve seat included with said body.

16. The device of claim 9 wherein said pilot means includes a detector pilot having a control member and a fluid pressure supply nozzle mounted for relative motion in response to a variation in said first fluid pressure and compensated supply means for supplying fluid pressure to said nozzle for reducing the change in spacing of said control member with respect to said nozzle upon a change in said first fluid pressure means.

17. The device of claim 10 including valve means which varies the flow of fluid into said first opposing measn as a function of said force.

18. The device of claim 10 wherein said pilot means includes a detector pilot having a control member and a fluid pressure supply nozzle mounted for relative motion in response to a variation in said first fluid pressure and compensated supply means for supplying fluid pressure to said nozzle for reducing the change in spacing of said control member with respect to said nozzle upon a change in said first fluid pressure.

19. Force measuring means adapted for a weighing device comprising: a movable support member connected through a biased support means resiliently and adjustably biased by an adjustable spring device into supporting relation with a force source and through a first fluid pressure responsive expandable force opposing means to a mount to oppose the gravitational force exerted by said source in response to a first fluid pressure exerted within said first opposing means, the intensity of said first fluid pressure being a function of said force, a second fluid responsive expandable force opposing means mounted between said support member and said mount to oppose a selected portion of the force of said source in response to a second fluid pressure exerted within said second opposing means, restriction means connected with said second opposing means to dampen variations in said second fluid pressure, and booster pilot means for supplying fluid under pressure to said first opposing means in quantity and pressure dependent on said first fluid pressure.

20. The measuring means of claim 19 wherein said measuring means is operable to measure the gravitational force from a liquid tube weighing means.

21. The measuring means of claim 19 including valve means which varies the flow of fluid into said first opposing means as a function of said force.

22. The measuring means of claim 21 wherein said valve means includes a spring biased valve member carried by said support member for movement with respect to a valve seat included with said body mount.

23. The measuring means of claim 19 wherein said booster pilot includes a detector pilot having a control member and a fluid pressure supply nozzle mounted for relative motion in response to variations in said first pressure and compensated supply means for supplying fluid pressure to said nozzle for spacing of said control member with respect to said nozzle upon a change in said first pressure.

24. The measuring means of claim 19 wherein said first opposing means and said second opposing means include concentrically disposed cylindrical bellows mounted between said movable support member and said body to define a cylindrical fluid pressure chamber and an annular fluid pressure chamber.

25. The measuring means of claim 19 wherein said support means includes a threaded collar effective against said support member and having a flange axially biased between spring means, a threaded adjustment means to vary the axial position of said flange between said spring means, and an adjustable support rod connected between said adjustment rod and said weighing means.

26. The measuring means of claims 19 wherein said weighing device comprises a tube for receiving a continuous flow of specimen to be weighed.

27. The measuring means of claim 19 wherein said pilot means varies the fluid supplied to said valve means as a function of said force.

28. The measuring means of claim 19 wherein said pilot means includes a control means responsive to said first fluid pressure to vary fluid flow to said restriction means.

29. Force measuring means adaptable to use in a weighing device comprising: a movable support member connected through a biased support means resiliently and adjustably biased by an adjustable spring device into supporting relation with a force source and through a fluid pressure responsive expandable force opposing means to a mount to opposite the gravitational force exerted by said source in response to a fluid pressure exerted within said opposing means, the fluid pressure being of intensity which is a function of said force.

30. The measuring means of claim 29 wherein said support means includes a threaded collar effective against said support member and having a flange axially biased between spring means, a threaded adjustment means to vary the axial position of said flange between said spring means, and an adjustable support rod connected between said adjustment rod and said weighing means.

31. The measuring means of claim 29 including a booster pilot comprising a detector pilot having a control member and a fluid pressure supply nozzle mounted for relative motion in response to variation in said pressure and compensated supply means for supplying fluid pressure to said nozzle for reducing the change in spacing of said control member with respect to said nozzle upon a change in said pressure.

32. The measuring means of claim 29 including valve means which varies the flow of fluid into said first opposing means as a function of said force.

33. The measuring means of claim 32 wherein said valve means includes a spring biased valve member carried by said support member for movement with respect to a valve seat included with said body mount.

34. Force measuring means for a weighing device comprising: a movable support member connected through a and adjustable support means resiliently and adjustably biased by an adjustable spring device into supporting relation with a force source and through a first fluid pressure responsive expandable force opposing means to a mount to oppose the gravitational force exerted by said source in response to a first fluid pressure exerted within said first opposing means, said fluid pressure being of intensity which is a function of said force, and a second fluid responsive expandable force opposing means mounted between said support member and said mount to oppose a selected portion of the force of said source in response to a second fluid pressure exerted within said second opposing means.

35. The measuring means of claim 34 including flow restriction means connected with said second opposing means to dampen variations in said second fluid pressure.

36. The measuring means of claim 34 wherein said first opposing means and said second opposing means include concentrically disposed cylindrical bellows mounted between said movable support member and said body to define a cyindrical fluid pressure chamber and an annular fluid pressure chamber.

37. The measuring means of claim 36 wherein said adjustable support means includes a threaded collar effective against said support member and having a flange axially biased between spring means, a threaded adjustment means to vary the axial position of said flange between said spring means, and an adjustable support rod connected between said adjustment rod and said weighing means.

38. The measuring means of claim 37 wherein said booster pilot includes a detector pilot having a control member and a fluid pressure supply nozzle mounted for relative motion in response to variation in said first pressure and compensated supply means for supplying fluid pressure to said nozzle for reducing the change in spacing of said control member with respect to said nozzle upon a change in said first pressure.

39. The measuring means of claim 38 including valve means which varies the flow of fluid into said first opposing means as a function of said force.

40. The measuring means of claim 39 wherein said valve means includes a spring biased valve member carried by said support member for movement with respect to a valve seat included with said body mount.

* * * * *